(No Model.) 6 Sheets—Sheet 1.

J. H. SHEPHERD.
SPIKE MACHINE.

No. 283,674. Patented Aug. 21, 1883.

WITNESSES
W. J. Cambridge
Chas. E. Griffin

INVENTOR
Joseph H. Shepherd
per P. Teschemacher
Atty (No Model.)

6 Sheets—Sheet 3.

J. H. SHEPHERD.
SPIKE MACHINE.

No. 283,674.

Patented Aug. 21, 1883.

WITNESSES

INVENTOR (No Model.) 6 Sheets—Sheet 4.
J. H. SHEPHERD.
SPIKE MACHINE.

No. 283,674. Patented Aug. 21, 1883.

(No Model.) 6 Sheets—Sheet 5.
J. H. SHEPHERD.
SPIKE MACHINE.
No. 283,674. Patented Aug. 21, 1883.
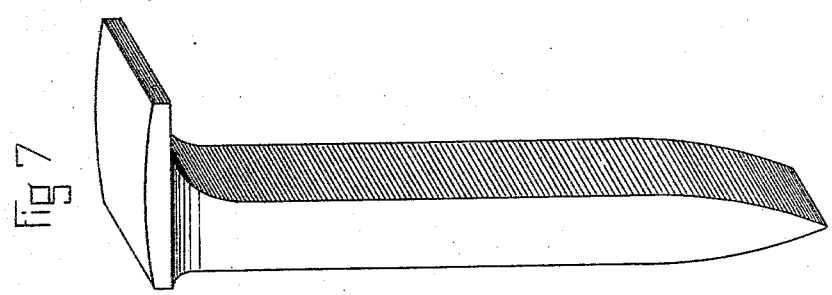
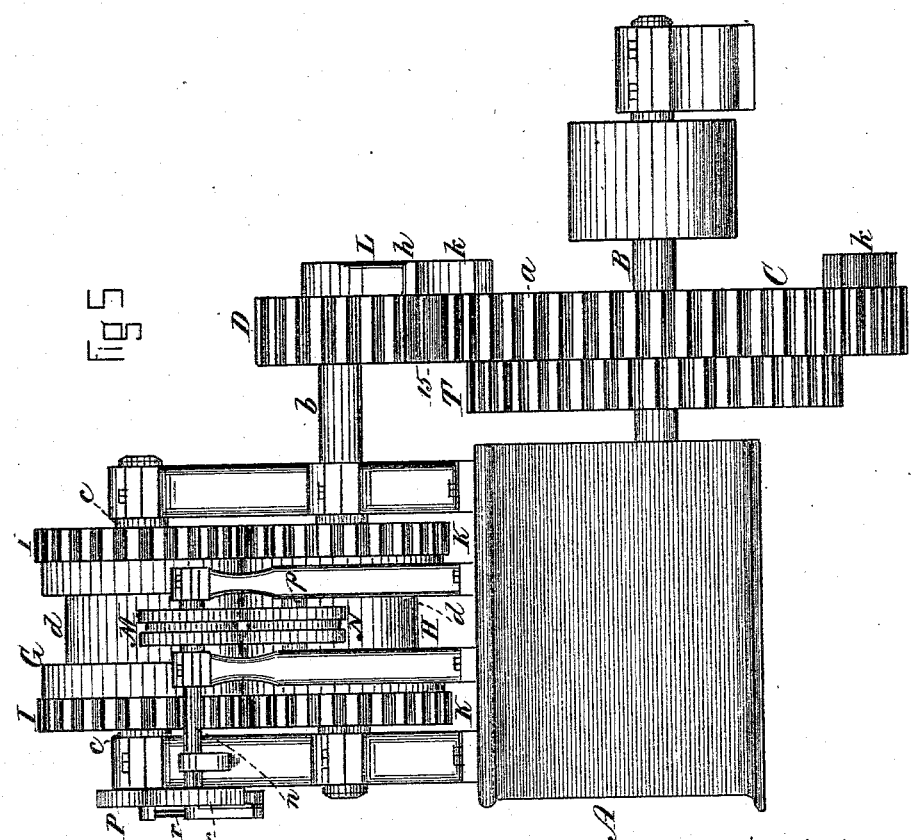
WITNESSES
W. H. Cambridge
Chas. E. Griffin
INVENTOR
Joseph H. Shepherd
Geo. H. Teschemacher
Atty (No Model.)
J. H. SHEPHERD.
SPIKE MACHINE.
No. 283,674. Patented Aug. 21, 1883.
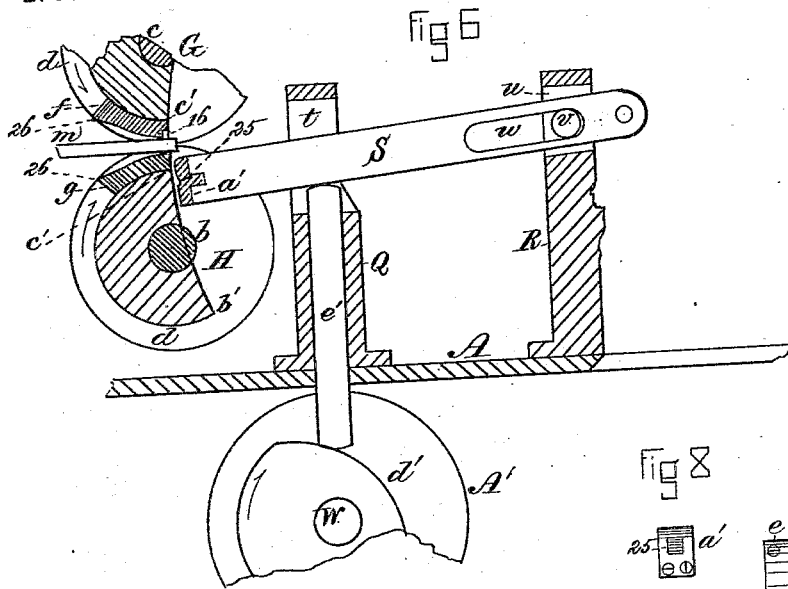
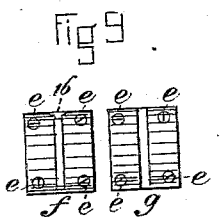
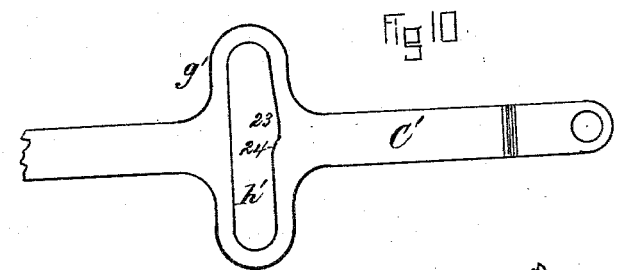
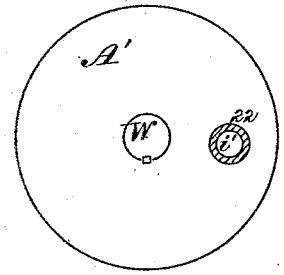
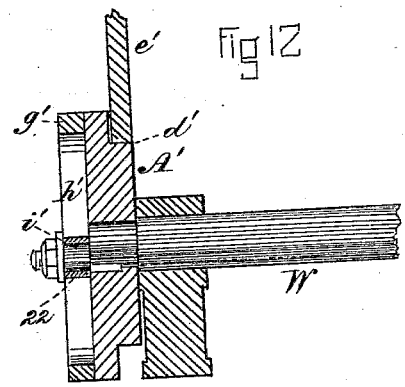
WITNESSES
INVENTOR

UNITED STATES PATENT OFFICE.

JOSEPH H. SHEPHERD, OF AUBURNDALE, MASSACHUSETTS.

SPIKE-MACHINE.

SPECIFICATION forming part of Letters Patent No. 283,674, dated August 21, 1883.

Application filed May 1, 1883. (No model.)

*To all whom it may concern:*

Be it known that I, JOSEPH H. SHEPHERD, a citizen of the United States, residing at Auburndale, in the county of Middlesex and State of Massachusetts, have invented certain Improvements in Machines for Forging Railway and Bridge Spikes, of which the following is a full, clear, and exact description, reference being had to the accompanying drawings, making part of this specification, in which—

Figure 1:
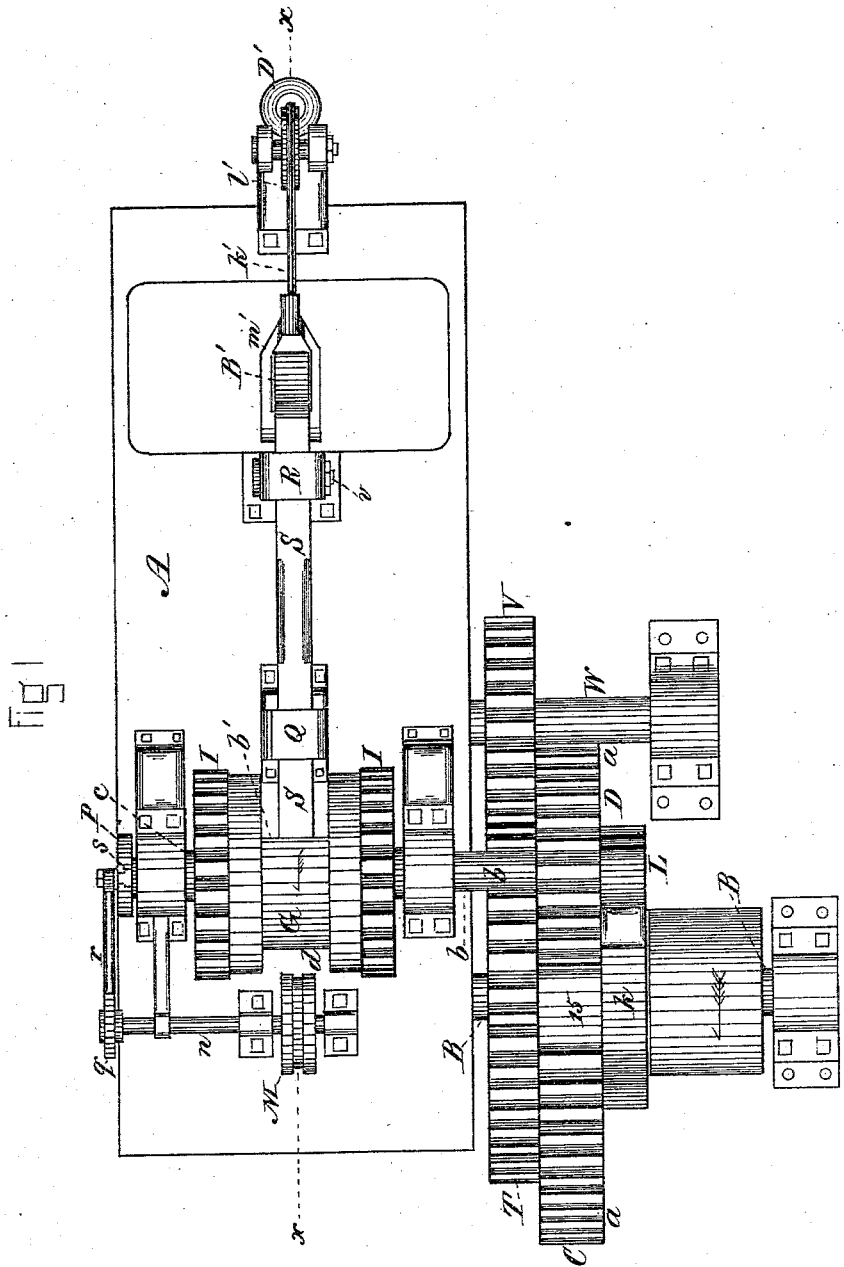
Figure 2:
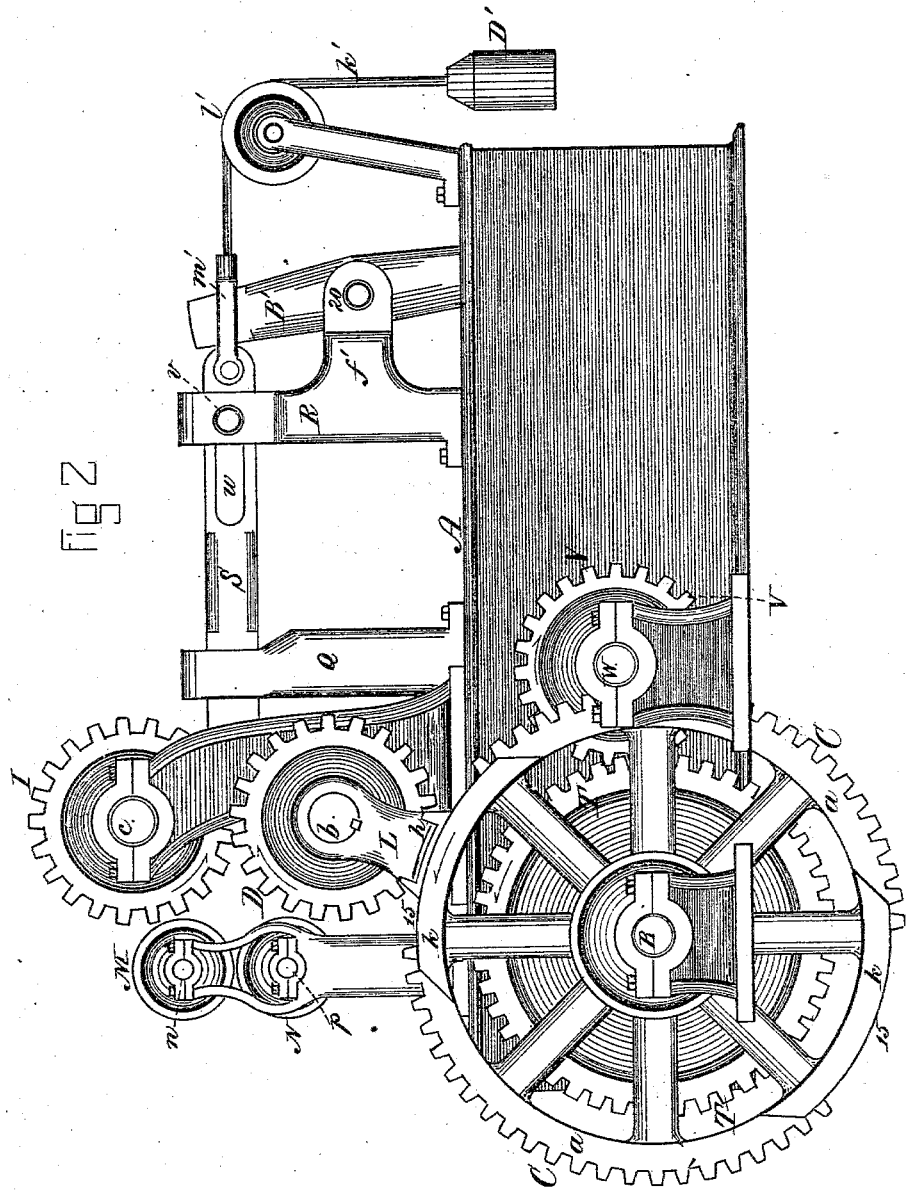
Figure 3:
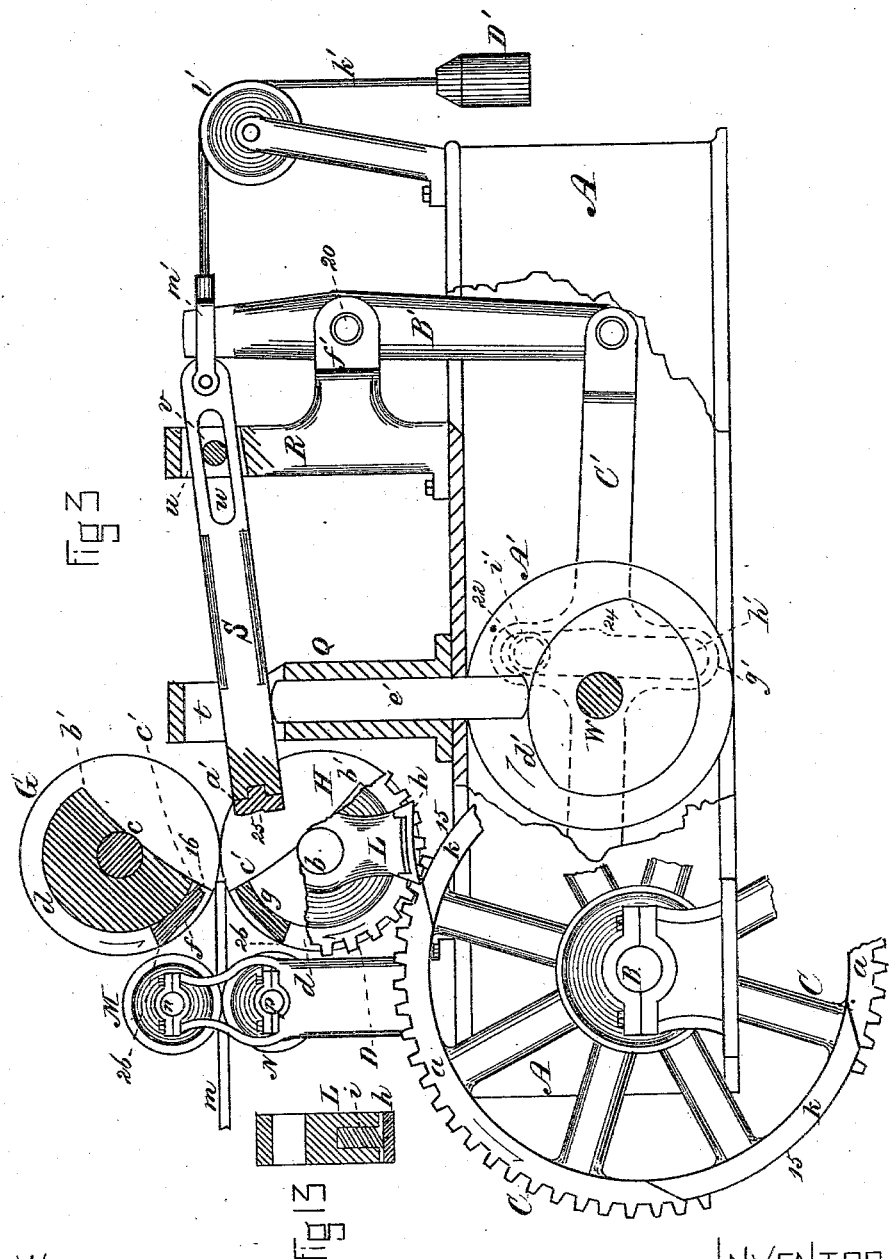
Figure 4:
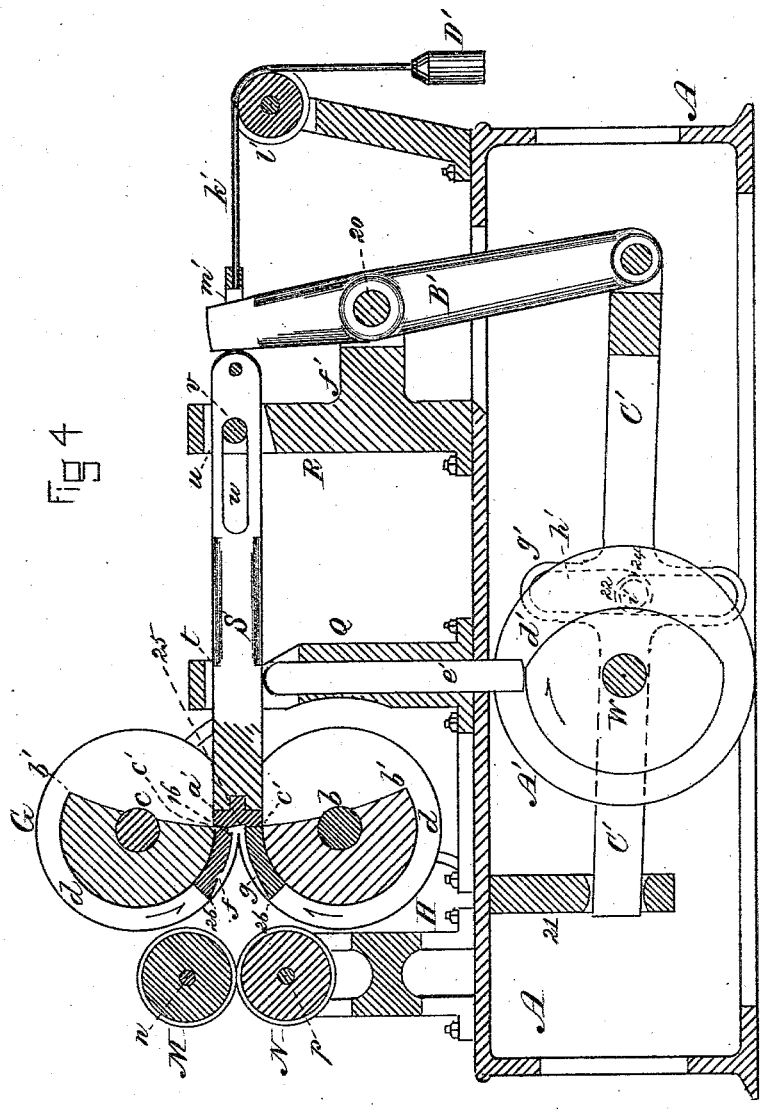

Figure 1 is a plan of a spike-machine constructed in accordance with my invention. Fig. 2 is an elevation of one side of the same. Fig. 3 is a sectional elevation of the same. Fig. 4 is a vertical section through the same on the line $x\,x$ of Fig. 1. Fig. 5 is a front elevation of the same. Fig. 6 is a sectional detail, showing the position of the parts just before the heading-die is brought into contact with the end of the bar to form the head of the spike. Fig. 7 is a view of a finished spike produced by my improved machine; Figs. 8, 9, 10, 11, 12, and 13, details.

My invention relates to certain improvements in machines for forging spikes, and has for its object to simplify the construction of such machines and enable them to perform their work more rapidly and perfectly than heretofore, thus reducing the cost of manufacturing spikes; and my invention consists in certain details of construction and combinations of parts, as hereinafter set forth and specifically claimed.

In the said drawings, A represents the bed or frame-work of the machine in suitable bearings, in which runs the driving-shaft B, which carries the large mutilated gear C, having two segments, $a$, of one hundred and thirty-five degrees each, provided with teeth which engage at the proper times with a gear, D, secured to the shaft $b$ of the lower one of a pair of forging-rolls, G H, the shaft $b$ and the shaft $c$ of the upper roll, which are supported in suitable bearings in standards rising from the bed A, being connected together by two pair of gears, I K, at the opposite ends of the rolls G H, whereby the latter are caused to rotate together with an equal surface motion. The number of teeth in the gear D equals the number of teeth in each of the segments $a$, and consequently the forging-rolls are each turned a single revolution by each segment $a$, two revolutions of the forging-rolls being produced by each complete rotation of the gear C, the revolution of the forging-rolls being intermittent on account of the toothless spaces or intervals 15 between the toothed segments $a$. The central portion of each of the rolls G H is turned down or reduced in diameter, forming a wide groove, $d$, and within these grooves are secured by screws $e$ the spike-forming dies $f\,g$, which lie flush with the portions of the rolls on each side of the grooves $d$, and may be of any required length or size. When one of the toothless portions 15 of the gear C, which occupies forty-five degrees of its periphery, is brought opposite to the gear D, the latter is prevented from being rotated further by its own momentum and that of the parts connected therewith, as is necessary to insure the dies being left in the exact position required, in the following manner:

To the shaft $b$, outside the gear D, is keyed a heavy arm, L, provided at its outer end with a yielding shoe, $h$, forced outward by a spring, $i$, Fig. 13, and adapted to bear upon either one of a pair of laterally-projecting segmental flanges, $k\,k$, on the outside edge of the gear C. These flanges are so located at the sides of the toothless portions of the gear C that one of them will always come into contact with and fit tightly under the shoe $h$ of the arm L as soon as the last tooth of one of the segments $a$ has passed out of contact with the teeth of the gear D, and the motion of the latter is thus instantly arrested, as desired. As the gear C continues to revolve, the flange $k$ slides under the shoe $h$, and passes out of contact therewith at the instant that the first tooth of the next segment meshes with the gear D, when, as the arm L is no longer in contact with the flange $k$, the gear is free to be revolved.

By providing the arm L with a yielding shoe, $h$, as described, a sudden shock or concussion upon the teeth of the gears I K, when the latter are stopped, is avoided, and injury or breakage thus prevented.

M N are the feed-rolls, by means of which the iron rod or bar $m$ from which the spikes are forged is fed into the machine. The shafts $n\,p$ of these rolls are supported in suitable bearings in uprights rising from the bed A, and to the upper shaft, $n$, is secured a ratchet-wheel, $q$, which is actuated by a pawl, $r$, pivoted to a wrist-pin projecting from a slide, s, made adjustable within a groove in a disk, P, secured to the shaft c of the upper roll, G.

Within slots t u, in a pair of uprights or guides, Q R, rising from the bed A, slides the heading-bar S, which is also pivoted on a pin, v, passing through the top of the upright R and a slot, w, in the bar S. This bar carries at its forward end the heading-die a', which is properly shaped to form the head of the spike, a portion of which is formed in the recess 16 in the die f.

The mechanism by which a compound horizontal reciprocating and vertical vibratory movement of the heading-bar is produced will now be described, the rolls G H being each cut away at the central portion from b' to c' in the arc of a circle having its center at the pin v, in order to allow of the vertical movement of the heading-bar and its die, as seen in Figs. 4 and 6.

On the driving-shaft B, between the gear C and the side of the bed A, is secured a heavy gear, T, provided with teeth around its entire periphery, the number of these teeth being the same as in the gear C—that is, the sum of the teeth of both segments a. The gear T meshes with and drives a gear, V, having one-half the number of teeth of the gear T. This gear V is keyed to one end of a horizontal shaft, W, having its bearings in the framework and carrying at its opposite end a disk, A', having on one side a cam d', upon which rests the lower end of a vertical push-bar, e', which slides within the guide Q and bears against the under side of the front end of the heading-bar S, and thus as the cam d' is rotated the end of the heading-bar S, which carries the heading-die a', is raised and lowered as required.

B' is a lever which is fulcrumed at 20 within a support, f', projecting from the rear side of the guide R, the upper end of this lever bearing against the rear end the heading-bar S, and the lower end being pivoted to a horizontal sliding bar, C', the front end of which is supported by and slides in a hanger, 21, Fig. 4.

At or near the center of the bar C' is a vertical cross-head, g, provided with a long slot, h', in which fits a friction-roll, 22, on a crank-pin, i', projecting from the face of the disk A', and thus as the latter is revolved the lever B' is caused to push forward the heading-bar S into the position seen in Fig. 4, after which, as the lever B' is vibrated in the opposite direction, the bar S is drawn back in a straight line by means of a weight, D', at the end of a cord, k', which passes over a pulley, l', and is connected by a link, m', with the rear end of the bar, the link embracing the end of the lever B', as seen in Fig. 1.

In one side of the slot h' is formed a depression, 23, the inclined side 24 of which forms a cam, which, when struck by the roll 22, causes the heading-die a' to be forced up solidly against the ends of the dies f g, as seen in Fig. 4.

The operation is as follows: The parts being in the position seen in Fig. 3, with the iron rod or bar m, properly heated, just caught between the rolls G H in line with the dies f g, the rolls are rotated into the position seen in Fig. 6 by the last few teeth on one of the segments a of the gear C, which remain in contact with the gear D. The instant the last tooth of this segment a leaves the gear D the arm L is brought squarely down onto one of the flanges k into the position seen in Fig. 2, which prevents any further motion of the forging-rolls G H, which then hold the rod m in the position seen in Fig. 6, with its end extending beyond the inner ends of the dies f g into the path of the heading-die a'. During this movement of the forging-rolls the heading-bar S has been advanced by the action of the lever B', and also raised on its pivot v, by the push-bar e', into the position seen in Fig. 6. As the cam d' continues to revolve the bar S is raised still further, which brings the heading-die a' into contact with the under side of the projecting end of the rod m, pushing up the iron to upset the head of the spike and forcing the metal into the recess 16 of the die f and the recess 25 of the die a', and as soon as the bar S has been raised to its highest point (when its longitudinal axis will form a prolongation of a straight horizontal line passing centrally between the dies f g) the roll 22 is brought into contact with the cam 24 of the slot h', when the heading-die will be suddenly forced up closely against the ends of the dies f g, as seen in Fig. 4, thus compressing and perfectly finishing the head of the spike. The heading-bar S now recedes in a straight line to allow sufficient clearance for the spike, when the next toothed segment a on the gear C having been rotated into a position to engage with the gear D, the rolls G H again commence to revolve, when the dies f g will form the remainder or shank of the spike, the sharp edges 26 of the dies pinching or cutting off the finished spike at the point, leaving the end of the rod m in proper shape to form the head of the next spike. The finished spike, Fig. 7, then drops out behind the rolls as soon as it is separated from the bar, the heading-bar S moves forward and downward at its front end, and the rolls G H are again brought into the position seen in Fig. 3, when the operation continues as before.

What I claim as my invention, and desire to secure by Letters Patent, is—

1. In a spike-machine, the combination, with the geared forging-rolls G H and their dies f g, constructed as described, the shaft b and gear D, of the mutilated gear C, provided with segments a, having an equal number of teeth, and means, substantially as described, for instantly stopping the gear D when either segment a has passed out of contact therewith, substantially as set forth.

2. In a spike-machine, the combination, with the geared forging-rolls G H and their dies f g, the shaft b and gear D, of the mutilated gear C, with its toothed segments $a$ and flanges $k$, and the arm L on the shaft $b$, having a yielding shoe, $h$, all constructed to operate substantially in the manner and for the purpose described.

3. In a spike-machine, the combination, with the forging-rolls G H, having their central portions cut away from $b'$ to $c'$, and provided with dies $f g$, of the heading-bar S, with its die $a'$, adapted to slide in guides Q R, and pivoted to the latter by a pin, $v$, passing through a slot, $w$, the lever B', bar C', with its slot $h'$, disk A', with its crank-pin $i'$ and cam $d'$, vertically-sliding push-bar $e'$, cord $k'$, and weight D', all constructed to operate substantially as and for the purpose set forth.

4. In a spike-machine, the combination, with the disk A' and cam $d'$, and the mechanism connected therewith for actuating the heading-bar S, and the cord $k'$ and weight D', of the shaft W, gears V and T, and the gears C D, and forging-rolls G H, with their dies $f g$, actuated thereby, all constructed and arranged to co-operate substantially as and for the purpose described.

5. In a spike-machine, the combination, with the disk A' and its crank-pin $i'$, provided with a friction-roll, 22, of the bar C', connected with the lever B' for operating the heading-bar S, and provided with a slot, $h'$, having an inclined side or cam, 24, whereby the final advance is given to the heading-die, substantially as set forth.

Witness my hand this 26th day of April, A. D. 1883.

JOSEPH H. SHEPHERD.

In presence of—
P. E. TESCHEMACHER,
W. J. CAMBRIDGE.